United States Patent
Lauer et al.

(10) Patent No.: US 7,647,643 B2
(45) Date of Patent: Jan. 12, 2010

(54) TEMPLATE ACCESS CONTROL LISTS

(75) Inventors: Craig Lauer, Bolton, MA (US); Thierry Paiement, Nepean (CA)

(73) Assignee: Cisco Technology, Inc., San Jose, CA (US)

( * ) Notice: Subject to any disclaimer, the term of this patent is extended or adjusted under 35 U.S.C. 154(b) by 482 days.

(21) Appl. No.: 11/026,454

(22) Filed: Dec. 30, 2004

(65) Prior Publication Data
US 2006/0156018 A1    Jul. 13, 2006

(51) Int. Cl.
*G06F 7/04*     (2006.01)
*H04L 9/32*     (2006.01)

(52) U.S. Cl. .............................. 726/27; 726/2; 713/165; 713/167

(58) Field of Classification Search .................. 713/165, 713/167; 726/2–3, 26–27
See application file for complete search history.

(56) References Cited

U.S. PATENT DOCUMENTS

| | | | |
|---|---|---|---|
| 6,289,460 B1 * | 9/2001 | Hajmiragha ................ | 726/28 |
| 7,010,573 B1 | 3/2006 | Saulpaugh et al. .......... | 709/206 |
| 7,016,966 B1 | 3/2006 | Saulpaugh et al. .......... | 709/230 |
| 7,051,078 B1 | 5/2006 | Cheriton | |
| 7,245,623 B1 * | 7/2007 | Cheriton ..................... | 370/393 |
| 2006/0136390 A1 * | 6/2006 | Zhao et al. ..................... | 707/3 |

OTHER PUBLICATIONS

Pankaj Gupta, Packet Classification on Multiple Fields, 1999, Standfor University, pp. 147-160.*
Bruce Schneier, Applied Cryptography, 1996, John Wiley & Sons, Second Edition, pp. 430-431.*
"main" (Administration Guide), Access Control Lists in Linux (B), Jul. 18, 2003, p. 501-519, www.suse.de/~agruen/acl/chapter/.
Cisco Systems, Inc."Turbo Access Control Lists", Jan. 16, 2003, www.cisco.com/univercd/cc/td/doc/product/software/ios121/121newft/121t/121t5/dttacl.htm.

* cited by examiner

*Primary Examiner*—Benjamin E Lanier
(74) *Attorney, Agent, or Firm*—BainwoodHuang (57) ABSTRACT

A method, apparatus and computer program product for producing and processing template access control lists (ACLs) is presented. The method, apparatus and computer program product obtain a first ACL having a first rule set, the first rule set including a peer Internet Protocol (IP) address. The first rule set is copied into the template ACL. The occurrences of a peer's IP address within the rule set of the template ACL are determined and are replaced with an indicator indicating that the peer's IP address is used in place of the indicator when the ACL is evaluated.

9 Claims, 4 Drawing Sheets

TEMPLATE ACCESS CONTROL LISTS

BACKGROUND

An Access Control List (ACL) is a sequential collection of permit/deny conditions (also referred to as a rule set) that apply to IP addresses and associated actions. ACLs are generally used to provide security filtering, though they may also be used to provide a generic packet classification facility. ACLs filter network traffic by controlling whether routed packets are forwarded or blocked at the router's interfaces. When a packet arrives on a router interface, software tests the packet against the conditions in the ACL to determine if there is a match between the IP header contents and the ACL entries. If there is a match, the actions associated with the first match will be applied. An ACL can be attached to packets received on an interface, and to packets outgoing on an interface. One important attribute of ACLs is that they are searched sequentially, so the rule that is applied is the first matching rule, not the rule that provides the best match.

Packet filtering using ACLs controls packet transmission throughout the network. This control can allow the network administrator to secure the network by limiting unnecessary or unwanted network traffic, and by restricting network use by certain users or devices. Security ACLs are used to permit or deny specified packets from crossing specified interfaces. They can be used to control the transmission of packets on an interface, to control virtual terminal line access, or to restrict the contents of routing updates. ACLs can also be used as a means of classifying packets for various route-maps, and for performing Quality of Service (QoS) checks.

There are different types of ACLs. One type of ACL is known as "TurboACL" in which a collection of ACLs is processed into a data structure. TurboACL has two basic parts. The first part is a process that takes the internal access control lists and builds a set of data tables. The second part is a run time operation that uses the packet header values and the data tables determined in the first part to lookup which entries in the ACL match this packet. The run time operation for TurboACL is very fast and is deterministic in that regardless of how many ACL entries there are, the same amount of processing power is consumed. This permits for improved processing time of ACLs in certain scenarios.

Another type of ACL is known as "MiniACL" in which an individual ACL is processed into a data structure. The MiniACL process takes the internal access control lists and builds a set of data tables. A run time operation uses the packet header values and the data tables to lookup which entries in the ACL match this packet. The run time operation is very fast and is deterministic in that no matter how many ACL entries there are, the same amount of processing power is consumed. This also permits for improved processing time of ACLs in certain environments. MiniACLs require less memory than TurboACLs, but can only support a limited number of rules per ACL.

SUMMARY

Conventional mechanisms such as those explained above suffer from a variety of drawbacks. One such drawback is that conventional ACL processing is performed using sequential matching of each rule of the ACL's rule set against a packet until a match is found. In large scale deployment of ACLs, this causes performance problems. Further, since the searching is done sequentially, the processing time is dependent on which rule matches the packet. An early match is found quickly with minimal processing time, but a non-match takes a worst-case time.

A drawback associated with conventional TurboACLs is that they are slow to compile and require large amounts of memory. A drawback associated with MiniACLs is that they also require a large amount of memory and are limited to only eight rules per ACL.

Embodiments of the invention significantly overcome such drawbacks and provide mechanisms and techniques that provide template ACLs. In a particular embodiment of a method for building a template ACL, a first ACL is obtained. The first ACL has a first rule set, and the first rule set includes a peer Internet Protocol (IP) address. This peer IP address is typically the IP address of the system which is the source or destination of the packet. The first rule set is copied into the template ACL, resulting in a template ACL rule set. The occurrence of a peer's IP address within the template ACL rule set is determined and replaced with an indicator indicating that the peer's IP address is used in place of the indicator when the ACL is evaluated. The indicator can be thought of a sort of "wildcard".

In a particular embodiment, a method wherein template ACLs are processed includes receiving an ACL. A checksum is calculated for the received ACL. A data structure containing previously processed ACL checksums is searched for a checksum which matches the checksum of the received ACL. When the checksum of the received ACL does not match a checksum in the data structure, then the checksum of the received ACL is added to the data structure of ACL checksums. When the checksum of the received ACL does match a checksum in the data structure, then a determination is made regarding whether a template for the ACL exists. When a template for the ACL does not exist then a new template is produced and the received ACL is pointed to the template.

Other embodiments include a computer readable medium having computer readable code thereon for building a template ACL. In a particular embodiment, the medium includes instructions for obtaining a first ACL. The first ACL has a first rule set, and the first rule set includes a peer Internet Protocol (IP) address. This peer IP address is typically the IP address of the system which may be the source or destination of the packet. The medium also includes instructions for copying the first rule set into the template ACL, resulting in a template ACL rule set. The medium further includes instructions for determining occurrences of a peer IP address within the template ACL, and for replacing the occurrences of the peer IP address with an indicator indicating that the peer's IP address is used in place of the indicator when the ACL is evaluated.

Still other embodiments include a computer readable medium having computer readable code thereon for providing and processing template ACLs. In a particular embodiment, the medium includes instructions for receiving an ACL and instructions for determining a checksum for the received ACL. The medium also includes instructions for checking a data structure of ACL checksums for a checksum which matches the checksum of the received ACL. The medium additionally includes instructions such that when the checksum of the received ACL does not match a checksum in the data structure, then the checksum of the received ACL is added to the data structure of ACL checksums, and when the checksum of the received ACL does match a checksum in the data structure, then a determination is made whether a template for the ACL exists. The medium further includes instructions for producing a new template when a template for the ACL does not exist as well as instructions for pointing the received ACL to the template.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides template ACLs as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing template ACLs as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those configured to perform other operations concurrently.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Template ACLs permit the repeated use of a single ACL with minor changes for each additional user. In a typical computing environment there may be several ACLs wherein each ACL is slightly different, including the user's IP address in one or more locations in the ACL. An ACL includes a rule set which indicates permit/deny conditions that apply to IP addresses and associated actions. When a packet arrives on a router interface, software tests the packet against the rule set in the ACL to determine if there is a match between the IP header contents and the rule set entries. If there is a match, the actions associated with the first match are applied.

An example ACL is shown below and includes a rule set having a header and 13 rules.

```
ip access-list extended Virtual-Access1.1#1
permit igmp any host 1.1.1.1
permit icmp host 1.1.1.1 any
deny ip host 44.33.66.36 host 1.1.1.1
deny tcp host 1.1.1.1 44.33.66.36
permit udp any host 1.1.1.1
permit udp host 1.1.1.1 any
permit udp any host 192.168.2.1
permit udp any host 192.170.2.1
permit icmp host 42.55.15.4 host 192.168.2.1
permit udp 11.22.11.0 0.0.0.255 host 192.177.2.1
permit tcp any host 192.170.2.1
permit ip host 42.55.15.4 host 192.168.2.1
permit tcp 11.22.11.0 0.0.0.255 host 192.177.2.1
```

Each rule is applied sequentially to the incoming or outgoing packet header to determine if there is a match. When a match occurs, then the appropriate action is taken. For example, when the rule set is being processed and rule "deny ip host 44.33.66.36 host 1.1.1.1" is encountered wherein a packet from a source having an IP address of 44.33.66.36 and destined for IP address 1.1.1.1, then the packet will be denied and node 1.1.1.1 will not receive the packet from source 44.33.66.36. The node IP address is referred to as the peer IP address.

It is not uncommon for several ACLs to have similar rule sets. For example a second rule set is shown below which is similar to the first rule set shown above.

```
ip access-list extended Virtual-Access1.1#2
permit igmp any host 13.1.1.2
permit icmp host 13.1.1.2 any
deny ip host 44.33.66.36 host 13.1.1.2
deny tcp host 13.1.1.2 44.33.66.36
permit udp any host 13.1.1.2
permit udp host 13.1.1.2 any
permit udp any host 192.168.2.1
permit udp any host 192.170.2.1
permit icmp host 42.55.15.4 host 192.168.2.1
permit udp 11.22.11.0 0.0.0.255 host 192.177.2.1
permit tcp any host 192.170.2.1
permit ip host 42.55.15.4 host 192.168.2.1
permit tcp 11.22.11.0 0.0.0.255 host 192.177.2.1
```

The first and second ACLs can be recognized as 'similar', and a new Template ACL can be provided which works for both rule sets. The difference between these two rule sets is that the first rule set has a peer IP address of 1.1.1.1 while the second rule set has a peer IP address of 13.1.1.2. The peer IP address for each rule set is replaced with an indicator (e.g., in this instance <MAGICIP>), as shown in the template ACL below

```
ip access-list extended template1
permit igmp any host <MAGICIP>
permit icmp host <MAGICIP> any
deny ip host 44.33.66.36 host <MAGICIP>
deny tcp host <MAGICIP> 44.33.66.36
permit udp any host <MAGICIP>
permit udp host <MAGICIP> any
permit udp any host 192.168.2.1
permit udp any host 192.170.2.1
permit icmp host 42.55.15.4 host 192.168.2.1
permit udp 11.22.11.0 0.0.0.255 host 192.177.2.1
permit tcp any host 192.170.2.1
permit ip host 42.55.15.4 host 192.168.2.1
permit tcp 11.22.11.0 0.0.0.255 host 192.177.2.1
```

Each indicator is translated into the IP address the user IP must match. There are 4 bits of interest for MagicIP comparison. There is a pair (source and destination) of key bits and a pair (source and destination) of mask bits. In the usual case, the mask bits will be 0's, indicating a don't-care condition, and the key bits will be 0. For matching an indicator, the key bit is set to 1, and the mask bit is also set to 1, indicating that the key bit in the input packet must be on as well.

Then, for each user, an IP address is associated. For example, two IP associations are provided below for illustrative purposes.

| | |
|---|---|
| Virtual-Access1.1#1 | 1.1.1.1 |
| Virtual-Access1.1#2 | 13.1.1.2 |

The interface knows which user a packet is coming from/going to, so the interface can obtain the user IP address for the comparison from the IP address table.

Template ACLs accommodate minimally changing ACLs at little cost, and minimize the memory and CPU consumption while simultaneously supporting several ACLs; each having rule sets containing any number of rules.

Figure 1:
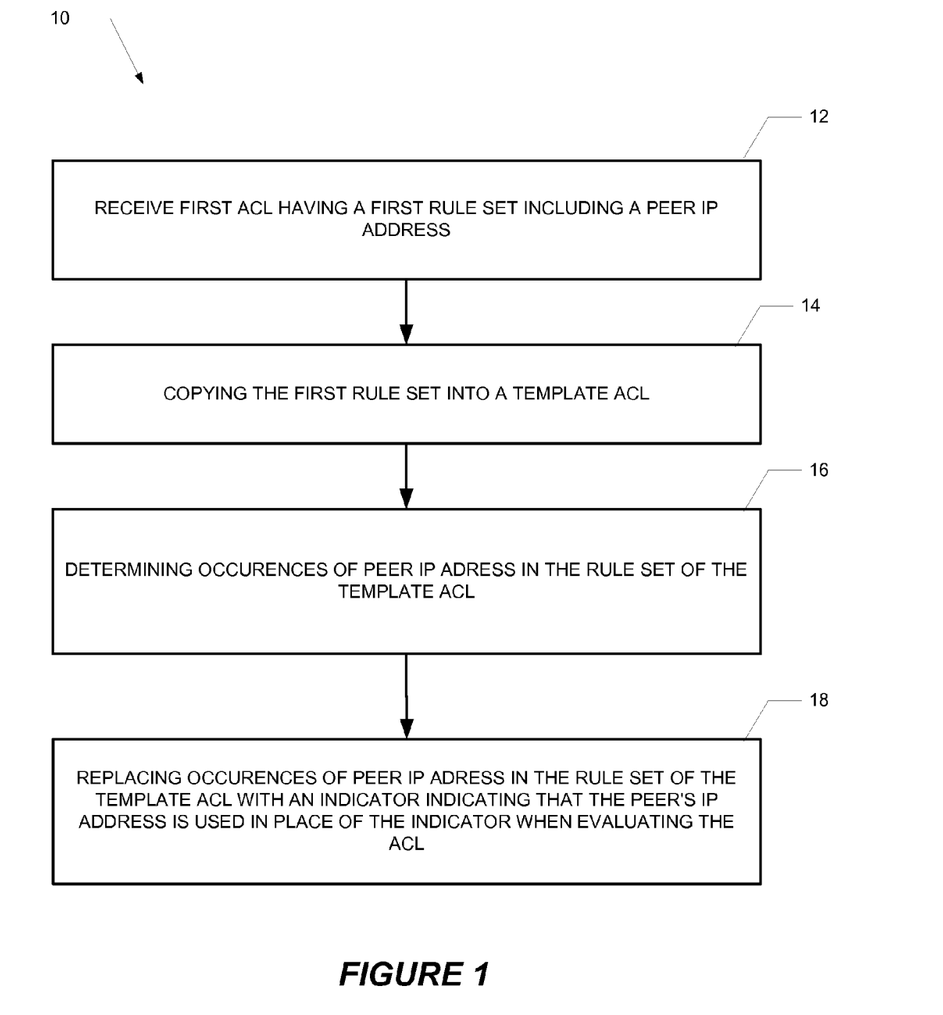
FIG. 1 is a flow diagram of a method for producing template ACLs in accordance with embodiments of the present invention.
Figure 2:
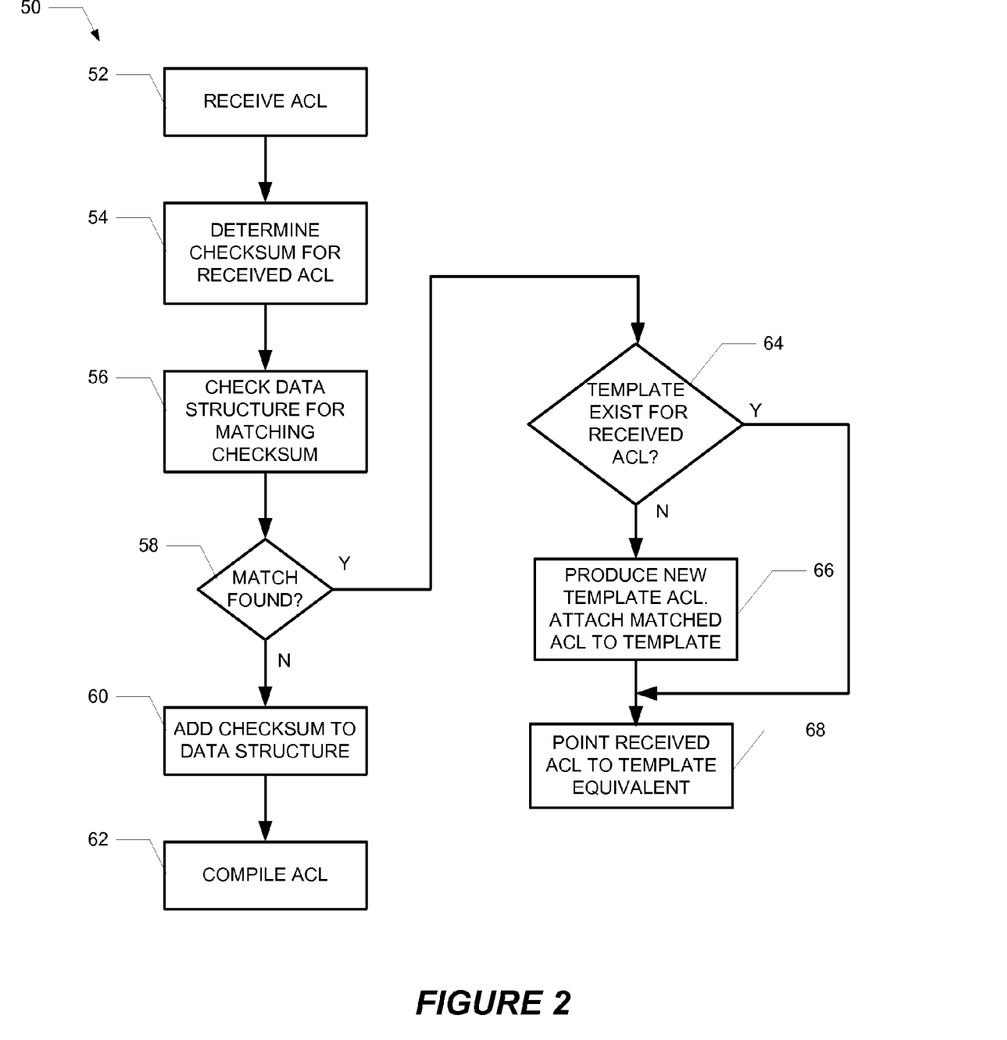
FIG. 2 is a flow diagram of a particular embodiment of a method for processing template ACLs.
Figure 3:
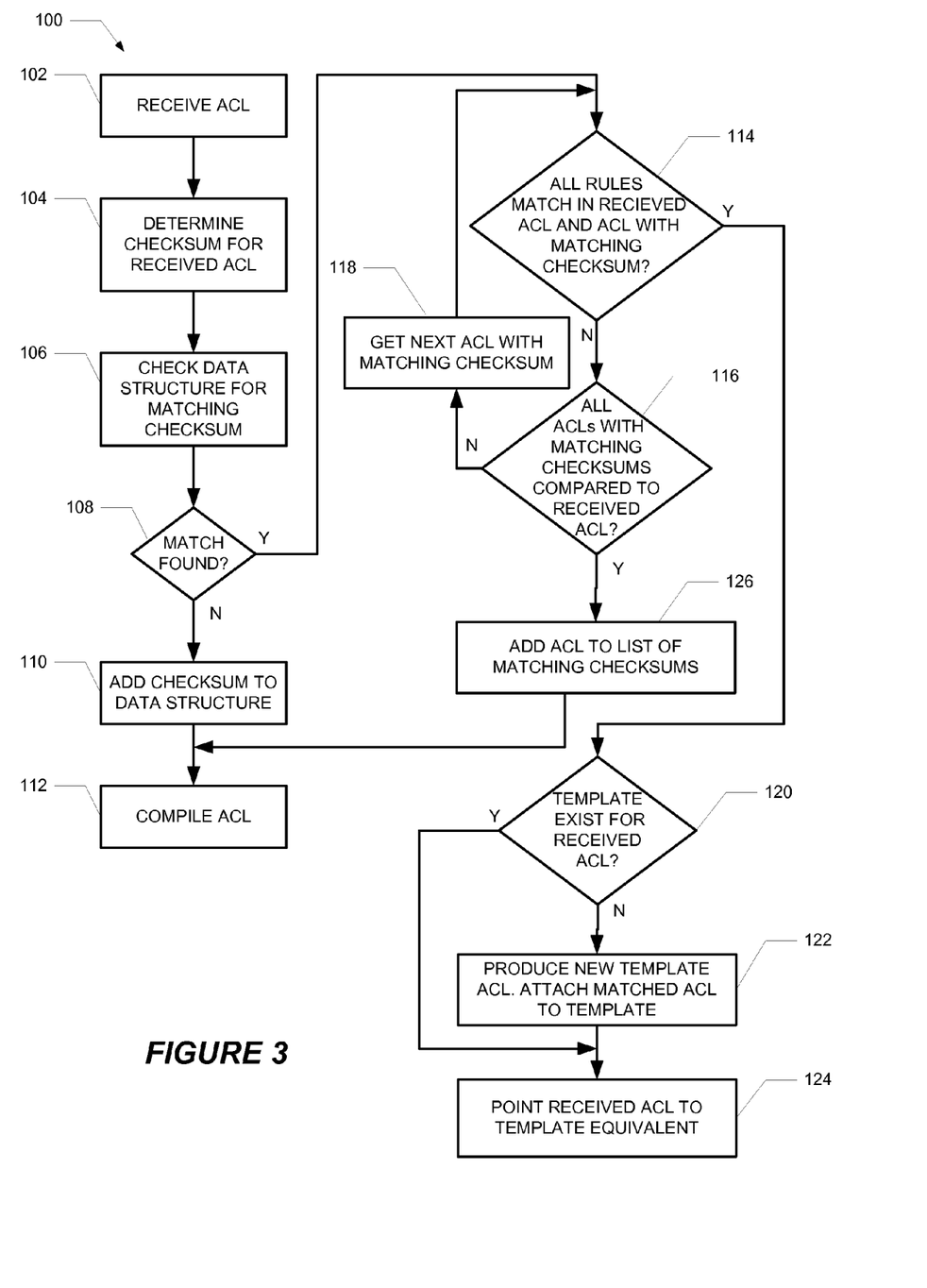
FIG. 3 is a flow diagram of another embodiment of a method for processing template ACLs.

Flow charts of the presently disclosed methods are depicted in FIGS. 1-3. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 1, a particular embodiment of a method 10 of producing a template ACL is shown. The method 10 begins with processing block 12 wherein a first ACL is received. The first ACL includes a first rule set, the first rule set including a peer Internet Protocol (IP) address.

In processing block 14, the first rule set is copied into the template ACL. Next, as shown in processing block 16, a determination is made regarding occurrences of peer IP addresses in the rule set of the template ACL.

In processing block 18, occurrences of a peer's IP address within the rule set of the template ACL are replaced with an indicator (e.g. <MAGICIP>) indicating that the peer's IP address is used in place of the indicator when the ACL is evaluated. In such a manner a template ACL is produced.

Referring now to FIG. 2, a particular method 50 of processing template Access Control Lists (ACLs) is shown. The method begins with processing block 52 wherein an ACL is received.

In processing block 54 a checksum is determined for the received ACL. This is done by walking through the ACL contents, building a checksum from the rules, while ignoring the peer IP addresses that match the user the ACL is applied to. In a particular embodiment the checksum comprises a Method Digest Algorithm 5 (MD5) digest value (128 bits). The use of a 128 bit checksum greatly diminishes the likelihood of a scenario wherein two different rule sets have the same checksum.

In processing block 56, a data structure of ACL checksums is searched for a checksum which matches the checksum of the received ACL.

In decision block 58, a determination is made whether a match was found. When a match is not found, processing continues with processing block 60. When a match is found, processing continues with decision block 64.

In processing block 60, when the checksum of the received ACL does not match a checksum in the data structure, then the checksum of the received ACL is added to the data structure of ACL checksums.

In processing block 62, the ACL is further processed, such as being compiled by a TurboACL or MiniACL process.

In decision block 64, when the checksum of the received ACL does match a checksum in the data structure, then a determination is made regarding whether a template for the ACL exists. When a template for the ACL does not exist, then processing continues at processing block 66. When a template does exist, then processing continues at processing block 68.

In processing block 66, when a template for the ACL does not exist then a new template is produced and the matching ACL is attached to the template.

In processing block 68, the received ACL is pointed to the template equivalent.

Referring now to FIG. 3, another embodiment of a method 100 of building and processing template Access Control Lists (ACLs) is shown. The method 100 begins with processing block 102 wherein an ACL is received.

In processing block 104 a checksum is determined for the received ACL. This is done by walking through the ACL contents, building a checksum from the rules, while ignoring the peer IP addresses that match the user the ACL is applied to. In a particular embodiment the checksum comprises a 32-bit value (FIG. 3), which requires less processing and less space than the 128-bit checksum used in the method described above and shown in FIG. 2. The use of a 32-bit checksum however does not avoid a scenario wherein two different rule sets have the same checksum. Additional processing is thus required to ensure that the same checksum did not result from two different rule sets.

In processing block 106, a data structure of ACL checksums is searched for a checksum which matches the checksum of the received ACL.

In decision block 108, a determination is made whether a match was found. When a match is not found, processing continues with decision block 110. When a match is found, processing continues with processing block 114.

In processing block 110, when the checksum of the received ACL does not match a checksum in the data structure, then the checksum of the received ACL is added to the data structure of ACL checksums.

In processing block 112, the ACL is further processed, such as being compiled by a TurboACL or MiniACL process. A particular method for producing a template ACL has been described above and shown in FIG. 1.

In decision block 114, when the determination made in decision block 108 is that a matching checksum has been found, then a determination is made regarding whether all the rules in the rule set of the present ACL match all the rules in the rule set having a matching checksum, ignoring all occurances of the peer IP addresses that match the user the ACL is applied to. This rule set matching is done to verify that even though two ACLs may have the same checksum, it is possible that the rule sets are in fact different. When the determination is that the ACL does match the ACL with the same checksum, processing continues at decision block 120. When the determination is that the ACL does not match the ACL with the same checksum, processing continues at decision block 116.

In decision block 116, a determination is made regarding whether all the ACLs which have the same checksum as the received ACL have been checked. When the determination is that there are other ACLs that have the same checksum as the received ACL then processing continues at processing block 118. When the determination is that there are no other ACLs with the same checksum as the received ACL that have not been checked yet, then processing continues at decision block 126. or when all the ACLs with a matching checksum have been compared to the received ACL, In processing block 118, the next ACL with a matching checksum as the received ACL is obtained, and processing continues at decision block 114. This loop comprising decision block 114, decision block 116 and processing block 118 may be performed multiple times depending upon the number of ACLs that have a matching checksum with the received ACL.

In decision block 120, when the checksum of the received ACL does match a checksum in the data structure, then a determination is made regarding whether a template for the ACL exists. When a template for the ACL does not exist, then processing continues at processing block 122. When a template does exist, then processing continues at processing block 124.

In processing block 122, when a template for the ACL does not exist then a new template is produced and the matching ACL is attached to the template.

In processing block 124, the received ACL is pointed to the template equivalent.

In processing block 126, the received ACL is added to the list of unique ACLs that match the checksum, and processing continues to processing block 112.

Figure 4:
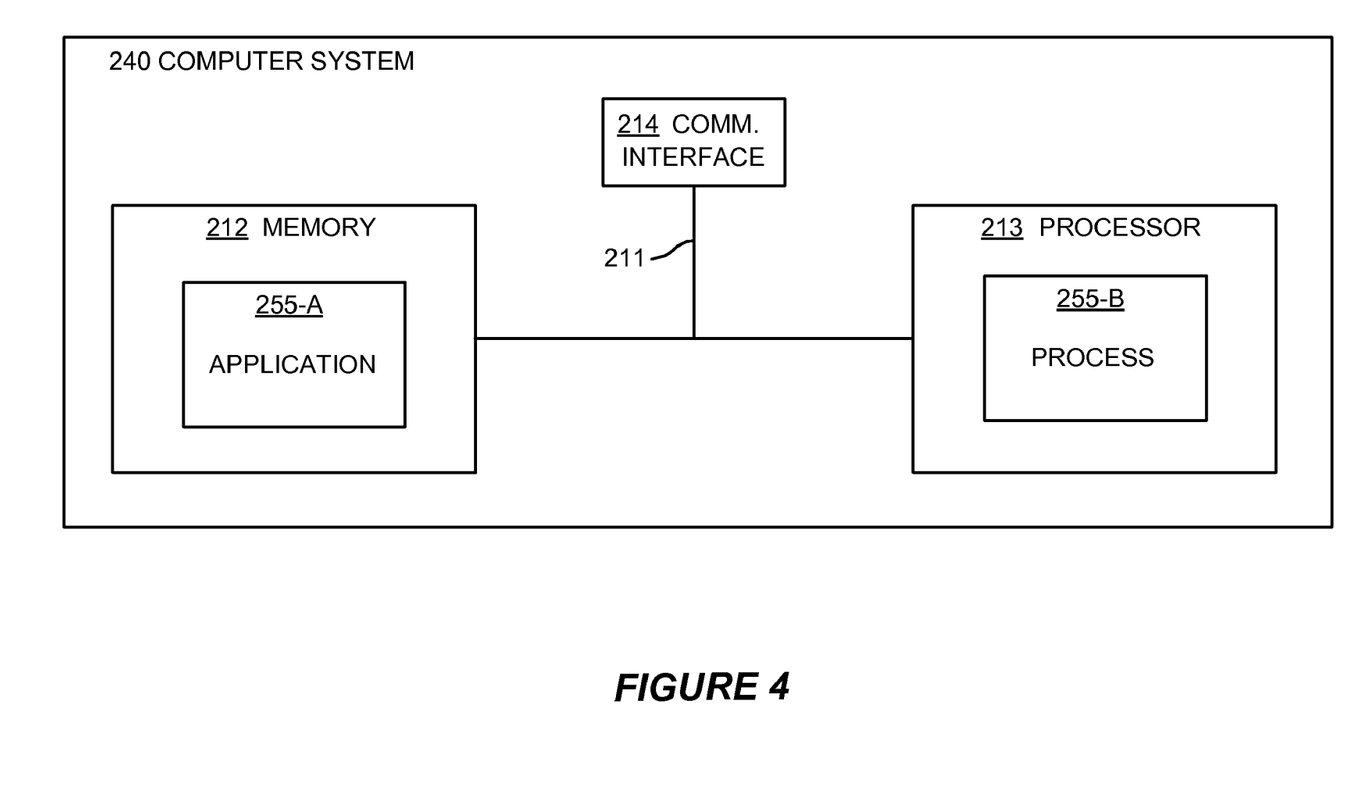
FIG. 4 illustrates an example computer system architecture for a computer system that provides and processes template ACLs in accordance with embodiments of the invention.

FIG. 4 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

While the present invention has been described mainly using ACLs as filters, it should also be appreciated that the same concepts apply to ACLs used for performing other functions such as Quality of Service (QoS), where selected packet types are handled differently within the network to provide a differentiated level of reliability, cost, etc. Additionally, the present invention is applicable in environments using a Ternary Content Addressable Memory (TCAM) which is used in routers to perform routing lookup functions.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. In a computerized device, a method of processing template Access Control Lists (ACLs) comprising:
   receiving an ACL;
   determining a checksum for the received ACL;
   checking a data structure of ACL checksums stored in a memory of the computerized device for a checksum which matches the checksum of the received ACL;
   when the checksum of the received ACL does not match a checksum in said data structure, then adding the checksum of the received ACL to the data structure of ACL checksums and compiling the changed ACL and storing the compiled ACL in the memory; and
   when the checksum of the received ACL does match a checksum in said data structure, then:
   (1) determining if a template for the ACL exists in the memory, and if so then pointing the received ACL to the existing template; and
   (2) when a template for the ACL does not exist in the memory, then producing a new template, storing the new template in the memory and pointing the received ACL to the new template.

2. The method of claim 1 wherein said determining a checksum comprises determining a 32-bit checksum.

3. The method of claim 1 wherein said determining a checksum comprises determining a 128-bit checksum.

4. The method of claim 1 wherein said data structure comprises an RBtree.

5. The method of claim 1 wherein said determining if a template for the ACL exists comprises:
   comparing the ACL to other ACLs having the same checksum and determining if said ACL matches any of said other ACLs having the same checksum;
   when said ACL does not match any of the other ACLs having the same checksum then adding the checksum of the received ACL to the data structure of ACL checksums and compiling the changed ACL; and
   when said ACL does match another of said ACLs having the same checksum then determining that said ACL has already been encountered.

6. The method of claim 1 wherein the received ACL has a first rule set including one or more occurrences of a peer Internet Protocol (IP) address, and wherein determining a checksum for the received ACL comprises ignoring the occurrences of the peer IP address in the ACL.

7. A computerized device, comprising:
   a memory; and
   a processor coupled to the memory,
   wherein the memory is encoded with instructions of an application which, when performed by the processor, cause the processor to perform a method of processing template Access Control Lists (ACLs) comprising:
   receiving an ACL;
   determining a checksum for the received ACL;
   checking a data structure of ACL checksums stored in the memory for a checksum which matches the checksum of the received ACL;
   when the checksum of the received ACL does not match a checksum in said data structure, then adding the checksum of the received ACL to the data structure of ACL checksums and compiling the changed ACL and storing the compiled ACL in the memory; and
   when the checksum of the received ACL does match a checksum in said data structure, then:
   (1) determining if a template for the ACL exists in the memory, and if so then pointing the received ACL to the existing template; and
   (2) when a template for the ACL does not exist in the memory, then producing a new template, storing the new template in the memory and pointing the received ACL to the new template;
   and wherein said determining if a template for the ACL exists comprises:
   (i) comparing the ACL to other ACLs having the same checksum and determining if said ACL matches any of said other ACLs having the same checksum;
   (ii) when said ACL does not match any of the other ACLs having the same checksum then adding the checksum of the received ACL to the data structure of ACL checksums and compiling the changed ACL; and
   (iii) when said ACL does match another of said ACLs having the same checksum then determining that said ACL has already been encountered.

8. A computerized device according to claim 7, wherein said checksum is a 32-bit checksum.

9. A computerized device according to claim 7, wherein said checksum is a 128-bit checksum.

* * * * *

UNITED STATES PATENT AND TRADEMARK OFFICE
CERTIFICATE OF CORRECTION

PATENT NO. : 7,647,643 B2
APPLICATION NO. : 11/026454
DATED : January 12, 2010
INVENTOR(S) : Lauer et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1284 days.

Signed and Sealed this

Twenty-eighth Day of December, 2010

David J. Kappos
*Director of the United States Patent and Trademark Office*